(12) United States Patent
Ueda et al.

(10) Patent No.: US 9,678,207 B2
(45) Date of Patent: Jun. 13, 2017

(54) OBJECT DETECTION DEVICE AND OBJECT DETECTION METHOD

(71) Applicant: Panasonic Intellectual Property Management Co., Ltd., Osaka (JP)

(72) Inventors: Akitoshi Ueda, Mie (JP); Shogo Sagara, Mie (JP); Hayato Naruse, Shiga (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/300,727

(22) PCT Filed: Mar. 11, 2015

(86) PCT No.: PCT/JP2015/001327
§ 371 (c)(1),
(2) Date: Sep. 29, 2016

(87) PCT Pub. No.: WO2015/155937
PCT Pub. Date: Oct. 15, 2015

(65) Prior Publication Data
US 2017/0108586 A1    Apr. 20, 2017

(30) Foreign Application Priority Data

Apr. 8, 2014  (JP) ................. 2014-079246

(51) Int. Cl.
*G01S 15/87* (2006.01)
*G01S 15/04* (2006.01)
(Continued)

(52) U.S. Cl.
CPC ........ *G01S 15/878* (2013.01); *G01S 7/52004* (2013.01); *G01S 15/04* (2013.01); *G01S 15/931* (2013.01); *G01S 2007/52009* (2013.01)

(58) Field of Classification Search
CPC ............. B64D 15/20; G01S 2007/4975; G01S 15/878; G01S 7/52004; G01S 15/04; G01S 15/931
See application file for complete search history.

(56) References Cited

U.S. PATENT DOCUMENTS

| 6,765,491 B1 | 7/2004 | Nass |
| 2004/0189514 A1 | 9/2004 | Schlick et al. |
(Continued)

FOREIGN PATENT DOCUMENTS

| JP | 6-118167 | 4/1994 |
| JP | 11-304919 | 11/1999 |
(Continued)

OTHER PUBLICATIONS

International Search Report of PCT application No. PCT/JP2015/001327 dated Jun. 16, 2015.

*Primary Examiner* — Curtis Odom

(74) *Attorney, Agent, or Firm* — McDermott Will & Emery LLP

(57) ABSTRACT

An object detection device includes a controller, a first sensor, and a second sensor. The first sensor transmits a first energy wave, and the second sensor transmits a second energy wave. The first sensor receives a reflected wave of the first energy wave to convert the reflected wave into a first self-signal, and receives a reflected wave of the second energy wave to convert the reflected wave into a first correspondence signal. The second sensor receives the reflected wave of the second energy wave to convert the reflected wave into a second self-signal, and receives the reflected wave of the first energy wave to convert the reflected wave into a second correspondence signal.

6 Claims, 1 Drawing Sheet

(51) Int. Cl.
*G01S 7/52* (2006.01)
*G01S 15/93* (2006.01)

(56) References Cited

U.S. PATENT DOCUMENTS

| | | | |
|---|---|---|---|
| 2004/0257556 A1* | 12/2004 | Samukawa | G01S 7/497 356/4.01 |
| 2005/0062615 A1 | 3/2005 | Braeuchle et al. | |
| 2008/0266052 A1 | 10/2008 | Schmid | |
| 2011/0241858 A1 | 10/2011 | Tsuzuki | |
| 2013/0028053 A1 | 1/2013 | Tsuji et al. | |

FOREIGN PATENT DOCUMENTS

| | | |
|---|---|---|
| JP | 2004-526976 | 9/2004 |
| JP | 2005-505074 | 2/2005 |
| JP | 2011-215002 | 10/2011 |
| WO | 2011/129001 | 10/2011 |

* cited by examiner

OBJECT DETECTION DEVICE AND OBJECT DETECTION METHOD

CROSS-REFERENCE TO RELATED APPLICATIONS

This application is a U.S. national stage application of the PCT International Application No. PCT/JP2015/001327 filed on Mar. 11, 2015, which claims the benefit of foreign priority of Japanese patent application No. 2014-079246 filed on Apr. 8, 2014 the contents all of which are incorporated herein by reference.

TECHNICAL FIELD

The present disclosure relates to an object detection device, and in particular, relates to an object detection device and an object detection method for measuring a distance to an object using an energy wave (wave motion).

BACKGROUND ART

An object detection device capable of measuring a distance to an object is widely known. An object detection device according to PTL 1 includes a plurality of ultrasonic sensors, a control circuit, a buzzer, and an indicator. The ultrasonic sensors transmit ultrasonic waves, and receive reflected waves from an object. By measuring a period from transmission to reception, the object detection device measures a distance from each of the ultrasonic sensors to the object. The ultrasonic sensors are configured such that each of the ultrasonic sensors receives a reflected wave originated from a wave that the sensor itself has emitted, but the sensor does not receive reflected waves originated from waves that the other ultrasonic sensors have emitted. And, the control circuit detects the object around a vehicle based on the ultrasonic waves transmitted and received by the ultrasonic sensors, as well as determines if snow is adhered around one or any of the ultrasonic sensors based on a length (period) of a reverberation wave received by the one or any of the ultrasonic sensors.

CITATION LIST

Patent Literature

PTL 1: Unexamined Japanese Patent Publication No. 2011-215002

SUMMARY OF THE INVENTION

An object detection device according to the present disclosure includes a controller, a first sensor, and a second sensor. The first sensor receives a first control signal from the controller, and transmits a first energy wave to a first region. The second sensor receives a second control signal from the controller, and transmits a second energy wave to a second region partially overlapping with the first region.

The first sensor is configured to receive a reflected wave of the first energy wave, convert the reflected wave into a first self-signal, and transmit the first self-signal to the controller, and to receive a reflected wave of the second energy wave, convert the reflected wave into a first correspondence signal, and transmit the first correspondence signal to the controller. The second sensor is configured to receive the reflected wave of the second energy wave, convert the reflected wave into a second self-signal, and transmit the second self-signal to the controller, and to receive the reflected wave of the first energy wave, convert the reflected wave into a second correspondence signal, and transmit the second correspondence signal to the controller.

The controller is configured to detect an object based on the first self-signal, the first correspondence signal, the second self-signal, and the second correspondence signal.

In addition, an object detection method according to the present disclosure includes: transmitting a first control signal to a first sensor and transmitting a second control signal to a second sensor; transmitting a first energy wave from the first sensor to a first region; transmitting a second energy wave from the second sensor to a second region partially overlapping with the first region; with the first sensor, receiving a reflected wave of the first energy wave to convert the reflected wave into a first self signal, and receiving a reflected wave of the second energy wave to convert the reflected wave into a first correspondence signal; with the second sensor, receiving the reflected wave of the second energy wave to convert the reflected wave into a second self-signal, and receiving the reflected wave of the first energy wave to convert the reflected wave into a second correspondence signal; and detecting an object based on the first self-signal, the first correspondence signal, the second self-signal, and the second correspondence signal.

DESCRIPTION OF EMBODIMENT

Figure 1:
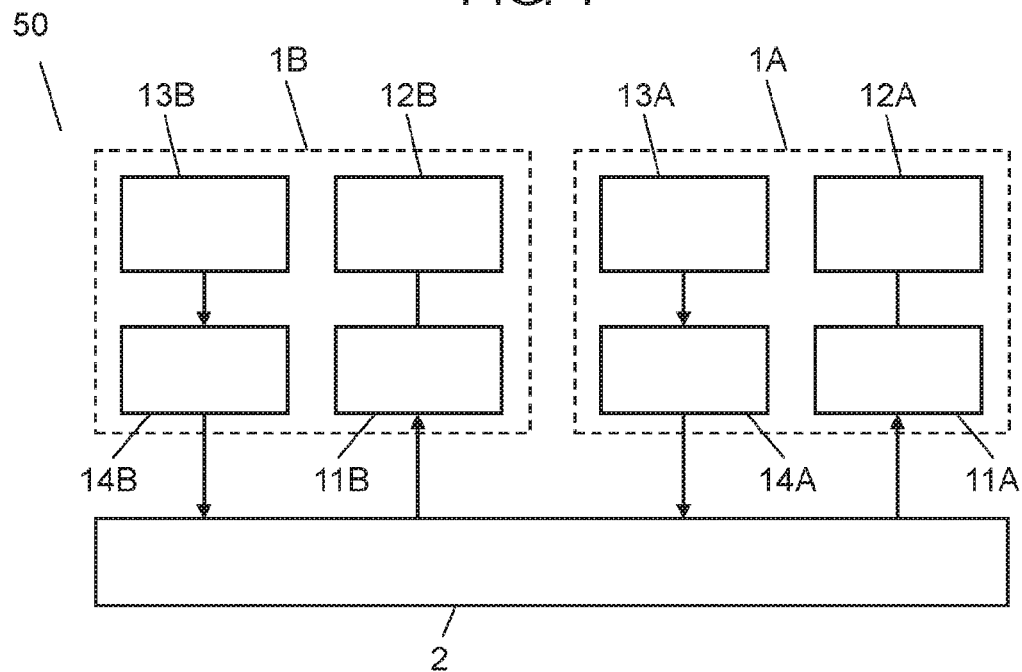
FIG. 1 is a block diagram of an object detection device according to an exemplary embodiment.

FIG. 1 is a block diagram illustrating object detection device 50 according to an exemplary embodiment.

Figure 2:
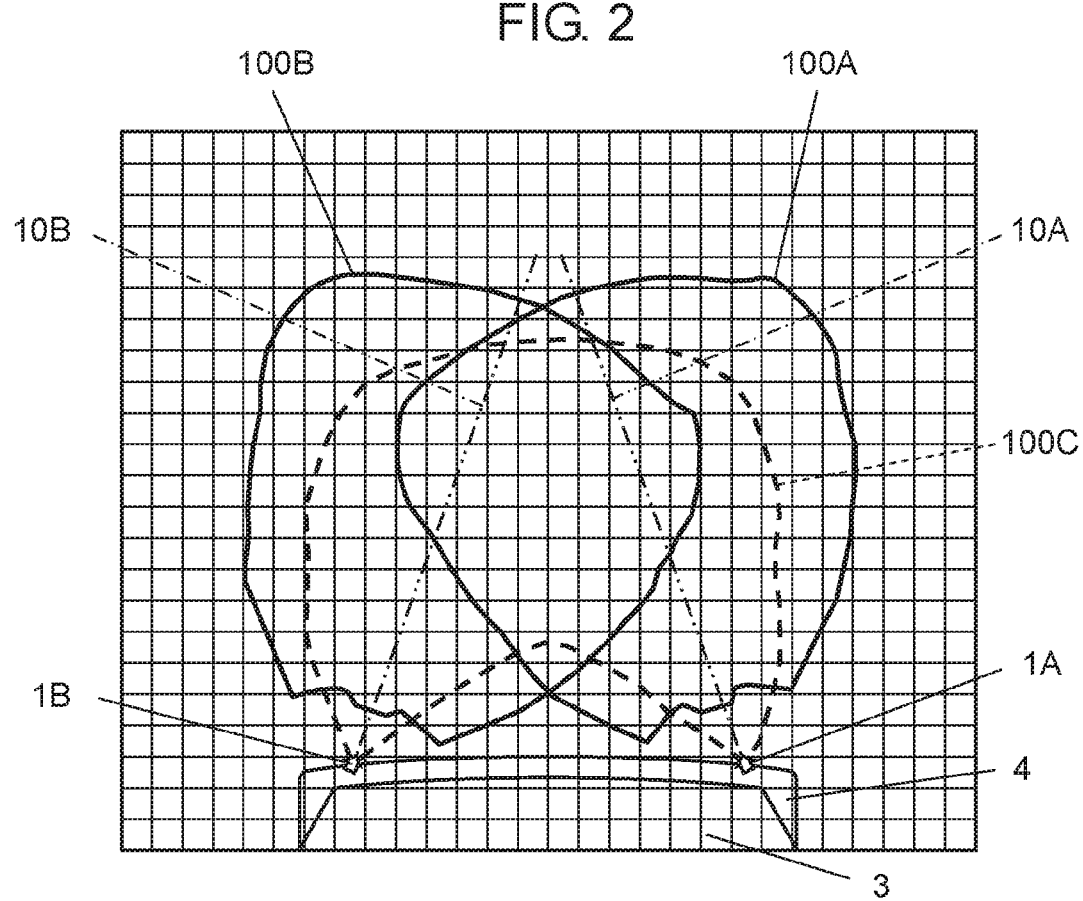
FIG. 2 is a schematic diagram illustrating detection regions of the object detection device according to the exemplary embodiment.

FIG. 2 is a schematic diagram illustrating detection regions of object detection device 50 according to the exemplary embodiment.

Object detection device 50 includes controller 2, first sensor 1A, and second sensor 1B. First sensor 1A receives a first control signal from controller 2, and transmits a first energy wave to first region 100A. Second sensor 1B receives a second control signal from controller 2, and transmits a second energy wave to second region 100B partially overlapping with first region 100A.

First sensor 1A is configured to receive a reflected wave of the first energy wave, convert the reflected wave into a first self-signal, and transmit the first self-signal to controller 2, and to receive a reflected wave of the second energy wave, convert the reflected wave into a first correspondence signal, and transmit the first correspondence signal to controller 2. Second sensor 1B is configured to receive the reflected wave of the second energy wave, convert the reflected wave into a second self-signal, and transmit the second self-signal to controller 2, and to receive the reflected wave of the first energy wave, convert the reflected wave into a second correspondence signal, and transmit the second correspondence signal to controller 2.

Controller 2 is configured to detect an object based on the first self-signal, the first correspondence signal, the second self-signal, and the second correspondence signal.

Object detection device 50 according to the present disclosure will be described below in details.

Object detection device 50 includes first sensor 1A, second sensor 1B, and controller 2. First sensor 1A and second sensor 1B are respectively disposed at different positions in a horizontal direction on bumper 4 fixed to vehicle 3. Bumper 4 is at least either a front bumper or a rear bumper. Moreover, although first sensor 1A and second sensor 1B are each configured to transmit an ultrasonic wave, i.e., energy wave (wave motion), first sensor 1A and second sensor 1B may each be configured to transmit another energy wave, for example, radio wave, other than the ultrasonic wave.

Controller 2 includes, for example, a micro-controller. Controller 2 is configured to transmit an ultrasonic wave having a predetermined duration from each of first sensor 1A and second sensor 1B. For example, controller 2 transmits a control signal to each of drive circuit 11A for first sensor 1A and drive circuit 11B for second sensor 1B to control oscillation of an oscillator (not shown) for each of drive circuit 11A and drive circuit 11B.

First sensor 1A includes drive circuit 11A, ultrasonic wave generator 12A, ultrasonic wave receiver 13A, and detection circuit 14A. In addition, second sensor 1B includes drive circuit 11B, ultrasonic wave generator 12B, ultrasonic wave receiver 13B, and detection circuit 14B.

Drive circuit 11A receives the control signal from controller 2, generates an oscillation signal with the oscillator, and outputs the oscillation signal as a drive signal to ultrasonic wave generator 12A. The drive signal output from drive circuit 11A causes a piezoelectric vibrator (not shown) of ultrasonic wave generator 12A to vibrate, whereby an ultrasonic wave is transmitted.

The ultrasonic wave is generated from a transmission surface of ultrasonic wave generator 12A along beam axis 10A. When the transmission surface of ultrasonic wave generator 12A is flat, beam axis 10A aligns with a normal line direction of the transmission surface.

Ultrasonic wave receiver 13A receives with its reception surface the ultrasonic wave arrived from first region 100A, second region 100B, or other regions, and converts the ultrasonic wave into an electric signal with a piezoelectric vibrator.

In addition, drive circuit 11B receives the control signal from controller 2, generates an oscillation signal with the oscillator, and outputs the oscillation signal as a drive signal to ultrasonic wave generator 12B. The drive signal output from drive circuit 11B causes a piezoelectric vibrator (not shown) of ultrasonic wave generator 12B to vibrate, whereby an ultrasonic wave is transmitted.

The ultrasonic wave is generated from a transmission surface of ultrasonic wave generator 12B along beam axis 10B. When the transmission surface of ultrasonic wave generator 12B is flat, beam axis 10B aligns with a normal line direction of the transmission surface.

Ultrasonic wave receiver 13B receives with its reception surface the ultrasonic wave arrived from first region 100A, second region 100B, or other regions, and converts the ultrasonic wave into an electric signal with a piezoelectric vibrator.

At this point, ultrasonic wave generator 12A and ultrasonic wave receiver 13A may be configured as, for example, a single ultrasonic wave transmitter/receiver having a piezoelectric vibrator. In addition, ultrasonic wave generator 12B and ultrasonic wave receiver 13B may be configured as, for example, a single ultrasonic wave transmitter/receiver having a piezoelectric vibrator.

Moreover, first sensor 1A and second sensor 1B are respectively attached to bumper 4 in a tilted state, where beam axis 10A of first sensor 1A and beam axis 10B of second sensor 1B intersect each other in front of bumper 4.

Detection circuit 14A includes an amplifier, a comparator, a Schmitt trigger, an A/D converter or the like (not shown). Detection circuit 14A amplifies with the amplifier an electric signal output from ultrasonic wave receiver 13A, and then detects the electric signal with the comparator or another device, generates a detection signal (reception signal), and outputs the detection signal to controller 2.

Similarly, detection circuit 14B includes an amplifier, a comparator, a Schmitt trigger, an A/D converter or the like (not shown). Detection circuit 14B amplifies with the amplifier an electric signal output from ultrasonic wave receiver 13B, and then detects the electric signal with the comparator or another device, generates a detection signal (reception signal), and outputs the detection signal to controller 2.

In addition, controller 2 detects, based on the reception signals received from first sensor 1A and second sensor 1B, an object present in each of a detectable region (first region 100A) of first sensor 1A and a detectable region (second region 100B) of second sensor 1B. Specifically, controller 2 measures a distance to the object based on an elapsed time from when the control signal is output to when the reception signal is received, and a speed (approximately 320 meters/second) of the ultrasonic wave.

Beam axis 10A of first sensor 1A and beam axis 10B of second sensor 1B intersect each other in front of bumper 4. Therefore, the ultrasonic wave transmitted from first sensor 1A and reflected by the object is received not only by first sensor 1A, which is a source of transmission, but also by second sensor 1B. Similarly, the ultrasonic wave transmitted from second sensor 1B and reflected by the object is received not only by second sensor 1B, which is a source of transmission, but also by first sensor 1A.

In the below description, a reception signal, which is a reflected wave of an ultrasonic wave transmitted from first sensor 1A obtained by receiving with first sensor 1A, is referred to as a first self-signal. A reception signal, which is a reflected wave of an ultrasonic wave transmitted from second sensor 1B obtained by receiving with second sensor 1B, is referred to as a second self-signal. A reception signal, which is the reflected wave of the ultrasonic wave transmitted from second sensor 1B obtained by receiving with first sensor 1A, is referred to as a first correspondence signal. A reception signal, which is the reflected wave of the ultrasonic wave transmitted from first sensor 1A obtained by receiving with second sensor 1B, is referred to as a second correspondence signal.

FIG. 2 illustrates first region 100A, second region 100B, and third region 100C, when vehicle 3 is viewed from above. First region 100A is a region in which first sensor 1A can receive the reflected wave of an ultrasonic wave transmitted from first sensor 1A to detect an object. Second region 100B is a region in which second sensor 1B can receive the reflected wave of an ultrasonic wave transmitted from second sensor 1B to detect an object. Third region 100C is a region in which first sensor 1A can receive the reflected wave of the ultrasonic wave transmitted from second sensor 1B to detect the object, and is also a region in which second sensor 1B can receive the reflected wave of the ultrasonic wave transmitted from first sensor 1A to detect the object. A region in which object detection device 50 can detect an object (maximum detection region) is determined by first region 100A, second region 100B, and third region 100C. However, third region 100C is equal to or smaller than a region in which first region 100A and second region 100B are added. And, a size relation among first region 100A, second region 100B, and third region 100C will be determined by a first start period, a second start period, a first specified period, and a second specified period described below.

Next, operation of object detection device 50 will be described below. Controller 2 outputs a control signal to first sensor 1A to operate a first timer circuit (not shown) so as to start measuring a first elapsed time. First sensor 1A receives the control signal from controller 2 to generate an ultrasonic wave. First sensor 1A and second sensor 1B each receive a reflected wave of the ultrasonic wave to transmit a reception signal to controller 2.

When the first elapsed time reaches the first start period, controller 2 can receive a reception signal (first self-signal) from first sensor 1A. That is, a near end to first sensor 1A in first region 100A is determined by the first start period.

In addition, when the first elapsed time reaches the second start period, controller 2 can receive a reception signal (second correspondence signal) from second sensor 1B. That is, a near end to first sensor 1A in third region 100C is determined by the second start period.

Moreover, a period during which controller 2 outputs the control signal to first sensor 1A, i.e. a duration of the ultrasonic wave transmitted from first sensor 1A, is set shorter than each of the first start period and the second start period.

When controller 2 receives the first self-signal from first sensor 1A, controller 2 obtains the first elapsed time from the first timer circuit. Then, controller 2 specifies the first elapsed time at that time as a first measurement period. That is, the first measurement period is a period from when controller 2 transmits the control signal to first sensor 1A to when controller 2 receives the first self-signal. If the first measurement period is equal to or shorter than the first specified period, controller 2 determines that an object is present in first region 100A.

In addition, when controller 2 receives the second correspondence signal from second sensor 1B, controller 2 obtains the first elapsed time from the first timer circuit. Then, controller 2 specifies the first elapsed time at that time as a second measurement period. That is, the second measurement period is a period from when controller 2 transmits the control signal to first sensor 1A and to when controller 2 receives the second correspondence signal. If the second measurement period is equal to or shorter than the second specified period, controller 2 determines that an object is present in third region 100C. Further, controller 2 can calculate a distance to the object based on the first measurement period and the second measurement period.

When the first elapsed time exceeds the first specified period, controller 2 stops receiving the first self-signal from first sensor 1A. Accordingly, a far end to first sensor 1A in first region 100A is determined by the first specified period.

In addition, when the first elapsed time exceeds the second specified period, controller 2 stops receiving the second correspondence signal from second sensor 1B. Accordingly, a far end to first sensor 1A in third region 100C is determined by the second specified period. At this point, the first specified period and the second specified period may be identical, or may be different.

On the other hand, controller 2 outputs a control signal to second sensor 1B to operate a second timer circuit (not shown) so as to start measuring a second elapsed time. Second sensor 1B receives the control signal from controller 2 to generate an ultrasonic wave. First sensor 1A and second sensor 1B each receive a reflected wave of the ultrasonic wave to transmit a reception signal to controller 2.

When the second elapsed time reaches the first start period, controller 2 can receive a reception signal (second self-signal) from second sensor 1B. That is, a near end to second sensor 1B in second region 100B is determined by the first start period.

In addition, when the second elapsed time reaches the second start period, controller 2 can receive a reception signal (first correspondence signal) from first sensor 1A. That is, a near end to second sensor 1B in third region 100C is determined by the second start period.

Moreover, a period during which controller 2 outputs the control signal to second sensor 1B, i.e. a duration of the ultrasonic wave transmitted from second sensor 1B, is set shorter than each of the first start period and the second start period.

When controller 2 receives the second self-signal from second sensor 1B, controller 2 obtains the second elapsed time from the second timer circuit. And, controller 2 specifies the second elapsed time at that time as a third measurement period. That is, the third measurement period is a period from when controller 2 operates the second timer circuit to transmit the control signal to second sensor 1B to when controller 2 receives the second self-signal. If the third measurement period is equal to or shorter than the first specified period, controller 2 determines that an object is present in second region 100B.

In addition, when controller 2 receives the first correspondence signal from first sensor 1A, controller 2 obtains the second elapsed time from the second timer circuit. Then, controller 2 specifies the second elapsed time at that time as a fourth measurement period. That is, the fourth measurement period is a period from when controller 2 operates the second timer circuit to transmit the control signal to second sensor 1B to when controller 2 receives the first correspondence signal.

If the fourth measurement period is equal to or shorter than the second specified period, controller 2 determines that an object is present in third region 100C. Further, controller 2 can calculate a distance to the object based on the first measurement period and the second measurement period.

When the second elapsed time exceeds the first specified period, controller 2 stops receiving the second self-signal from second sensor 1B. Accordingly, a far end to second sensor 1B in second region 100B is determined by the first specified period.

In addition, when the second elapsed time exceeds the second specified period, controller 2 stops receiving the first correspondence signal from first sensor 1A. Accordingly, a far end to second sensor 1B in third region 100C is determined by the second specified period. The first specified period and the second specified period may be identical, or may be different.

At this point, even when a foreign substance such as snow and mud is adhered on the transmission surfaces of ultrasonic wave generators 12A, 12B, the foreign substance vibrates together with the transmission surfaces, and therefore ultrasonic wave generators 12A, 12B can transmit ultrasonic waves. On the other hand, if a foreign substance such as snow and mud is adhered on the reception surfaces of ultrasonic wave receivers 13A, 13B, ultrasonic waves (reflected waves) are reflected by the foreign substance, and therefore ultrasonic wave receivers 13A, 13B cannot receive reflected waves.

Accordingly, controller 2 determines that a foreign substance is likely to be adhered on first sensor 1A when a first condition is met. The first condition is a condition in which a second correspondence signal is equal to or above a threshold, and a first self-signal is below the threshold. At this point, the second correspondence signal being equal to or above the threshold means that an object is detected in third region 100C.

If an object is present in third region 100C, the object should be detected in accordance with both of the second correspondence signal and the first self-signal. However, if an object is detected in accordance with the second correspondence signal, but no object is detected in accordance with the first self-signal, a foreign substance is likely to be adhered on the reception surface of first sensor 1A.

Further, controller 2 may be preferably configured to determine that a foreign substance is adhered on first sensor 1A when a second condition is met in addition to the first condition. The second condition is a condition in which a second self-signal is equal to or above a threshold, and a first correspondence signal is below the threshold. At this point, the second self-signal being equal to or above the threshold means that an object is detected in second region 100B.

If the second condition is met in addition to the first condition, it can be determined that a foreign substance is highly likely to be adhered on the reception surface of first sensor 1A.

In addition, controller 2 determines that a foreign substance is likely to be adhered on second sensor 1B when a third condition is met. The third condition is a condition in which an object is detected in third region 100C in accordance with a signal level of the first correspondence signal, and the second self-signal is equal to or below a predetermined lower limit value.

If an object is present in third region 100C, the object should be detected in accordance with both of the first correspondence signal and the second self-signal. However, if an object is detected in accordance with the first correspondence signal, but no object is detected in accordance with the second self-signal, a foreign substance is likely to be adhered on the reception surface of second sensor 1B.

Further, controller 2 may be preferably configured to determine that a foreign substance is adhered on second sensor 1B when a fourth condition is met in addition to the third condition. The fourth condition is a condition in which an object is detected in first region 100A in accordance with the first self-signal, and a signal level of the second correspondence signal is equal to or below a predetermined lower limit value.

If the fourth condition is met in addition to the third condition, it can be determined that a foreign substance is highly likely to be adhered on the reception surface of second sensor 1B.

Moreover, the exemplary embodiment uses two sensors, i.e., first sensor 1A and second sensor 1B. However, three or more sensors may be used.

Object detection device 50 according to the present disclosure increases accuracy in detecting an object since object detection device 50 not only separately detects the object with each of first sensor 1A and second sensor 1B, but also detects the object by first sensor 1A and second sensor 1B in a pair. Further, with object detection device 50 according to the present disclosure, such a pair of first sensor 1A and second sensor 1B can easily detect adhesion of a foreign substance such as snow and mud.

Use of object detection device 50 according to the present disclosure can increase accuracy in detecting an object, as well as can easily detect adhesion of a foreign substance.

The invention claimed is:
1. An object detection device comprising:
a controller;
a first sensor that receives a first control signal from the controller and transmits a first energy wave to a first region; and
a second sensor that receives a second control signal from the controller and transmits a second energy wave to a second region partially overlapping with the first region,
wherein the first sensor is configured to receive a reflected wave of the first energy wave, convert the reflected wave into a first self-signal, and transmit the first self-signal to the controller, and to receive a reflected wave of the second energy wave, convert the reflected wave into a first correspondence signal, and transmit the first correspondence signal to the controller,
the second sensor is configured to receive the reflected wave of the second energy wave, convert the reflected wave into a second self-signal, and transmit the second self-signal to the controller, and to receive the reflected wave of the first energy wave, convert the reflected wave into a second correspondence signal, and transmit the second correspondence signal to the controller,
the controller is configured to detect an object based on the first self-signal, the first correspondence signal, the second self-signal, and the second correspondence signal, and
when the second correspondence signal is equal to or above a threshold, and the first self-signal is below the threshold, the controller determines that a foreign substance is adhered on the first sensor.

2. The object detection device according to claim 1, wherein, when the second self-signal is equal to or above the threshold, and a signal level of the first correspondence signal is below the threshold, the controller determines that a foreign substance is adhered on the first sensor.

3. The object detection device according to claim 1, wherein
when the controller receives the first self-signal in a first specified period, the controller determines that the object is present in the first region,
when the controller receives the second self-signal in the first specified period, the controller determines that the object is present in the second region, and
when the controller receives the first correspondence signal or the second correspondence signal in a second specified period, the controller determines that the object is present in at least a part of the first region and a part of the second region.

4. An object detection method comprising:
transmitting a first control signal to a first sensor and transmitting a second control signal to a second sensor;
transmitting a first energy wave from the first sensor to a first region;
transmitting a second energy wave from the second sensor to a second region partially overlapping with the first region;
with the first sensor, receiving a reflected wave of the first energy wave to convert the reflected wave into a first self-signal, and receiving a reflected wave of the second energy wave to convert the reflected wave into a first correspondence signal;
with the second sensor, receiving the reflected wave of the second energy wave to convert the reflected wave into a second self-signal, and receiving the reflected wave of the first energy wave to convert the reflected wave into a second correspondence signal;

detecting an object based on the first self-signal, the first correspondence signal, the second self-signal, and the second correspondence signal; and determining that a foreign substance is adhered on the first sensor, when the second correspondence signal is equal to or above a threshold, and the first self-signal is below the threshold.

5. The object detection method according to claim 4, further comprising:

determining that a foreign substance is adhered on the first sensor when the second self-signal is equal to or above the threshold, and a signal level of the first correspondence signal is below the threshold.

6. The object detection method according to claim 4, further comprising:

determining that the object is present in the first region when the first self-signal is received in a first specified period;

determining that the object is present in the second region when the second self-signal is received in the first specified period; and determining that the object is present in at least a part of the first region and a part of the second region when the first correspondence signal or the second correspondence signal is received in a second specified period.

* * * * *